United States Patent
Singh et al.

(10) Patent No.: US 11,631,156 B2
(45) Date of Patent: Apr. 18, 2023

(54) IMAGE GENERATION AND EDITING WITH LATENT TRANSFORMATION DETECTION

(71) Applicant: ADOBE INC., San Jose, CA (US)

(72) Inventors: Mayank Singh, Noida (IN); Parth Patel, Vadodara (IN); Nupur Kumari, Noida (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 149 days.

(21) Appl. No.: 17/088,120

(22) Filed: Nov. 3, 2020

(65) Prior Publication Data

US 2022/0138897 A1 May 5, 2022

(51) Int. Cl.
| | | |
|---|---|---|
| G06T 3/00 | (2006.01) | |
| G06K 9/62 | (2022.01) | |
| G06N 3/04 | (2023.01) | |
| G06T 7/73 | (2017.01) | |
| G06T 3/40 | (2006.01) | |
| G06N 3/08 | (2023.01) | |

(52) U.S. Cl.
CPC .......... *G06T 3/0075* (2013.01); *G06K 9/6256* (2013.01); *G06N 3/04* (2013.01); *G06N 3/08* (2013.01); *G06T 3/4007* (2013.01); *G06T 7/73* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2021/0012486 A1* | 1/2021 | Huang | G06N 3/08 |
| 2021/0209464 A1* | 7/2021 | Bala | G06N 3/08 |

OTHER PUBLICATIONS

Patel, P., Kumari, N., Singh, M., & Krishnamurthy, B. (2021). LT-GAN: Self-Supervised GAN with Latent Transformation Detection. In Proceedings of the IEEE/CVF Winter Conference on Applications of Computer Vision (pp. 3189-3198).

Brock, A., Donahue, J., & Simonyan, K. (2018). Large scale GAN training for high fidelity natural image synthesis. arXiv preprint arXiv:1809.11096.

Heusel, M., Ramsauer, H., Unterthiner, T., Nessler, B., & Hochreiter, S. (2017). Gans trained by a two time-scale update rule converge to a local nash equilibrium. arXiv preprint arXiv:1706.08500.

Karras, T., Laine, S., & Aila, T. (2019). A style-based generator architecture for generative adversarial networks. In Proceedings of the IEEE/CVF Conference on Computer Vision and Pattern Recognition (pp. 4401-4410).

(Continued)

*Primary Examiner* — Leon Flores
(74) *Attorney, Agent, or Firm* — Shook, Hardy & Bacon L.L.P.

(57) ABSTRACT

This disclosure includes technologies for image processing, particularly for image generation and editing in a configurable semantic direction. A generative adversarial network is trained with an auxiliary network with an auxiliary task that is designed to disentangle the latent space of the generative adversarial network. Resultantly, a new type of GAN is created to improve image generation or editing in both conditional and unconditional settings.

19 Claims, 5 Drawing Sheets

(56) References Cited

OTHER PUBLICATIONS

Miyato, T., Kataoka, T., Koyama, M., & Yoshida, Y. (2018). Spectral normalization for generative adversarial networks. arXiv preprint arXiv:1802.05957.
Plumerault, A., Borgne, H. L., & Hudelot, C. (2020). Controlling generative models with continuous factors of variations. arXiv preprint arXiv:2001.10238.
Salimans, T., Goodfellow, I., Zaremba, W., Cheung, V., Radford, A., & Chen, X. (2016). Improved techniques for training gans. arXiv preprint arXiv:1606.03498.
Shen, Y., Gu, J., Tang, X., & Zhou, B. (2020). Interpreting the latent space of gans for semantic face editing. In Proceedings of the IEEE/CVF Conference on Computer Vision and Pattern Recognition (pp. 9243-9252).
Zhang, H., Zhang, Z., Odena, A., & Lee, H. (2019). Consistency regularization for generative adversarial networks. arXiv preprint arXiv:1910.12027.

* cited by examiner

IMAGE GENERATION AND EDITING WITH LATENT TRANSFORMATION DETECTION

BACKGROUND

Image generation and editing have been an active field of research and innovation. One active branch in this field is computer-generated imagery (CGI), which refers to the application of computer graphics to generate or edit two-dimensional (2D) or three-dimensional (3D) images in art, printed media, motion pictures, video games, etc. Another related branch in this field is media generated by artificial intelligence (AI), which refers to the production, manipulation, and modification of data and media using AI methods.

AI-generated media, also referred to as synthetic media have proliferated since the creation of generative adversarial networks (GANs). GANs have become a common solution as generative models in modeling complex data distributions, such as visual or audio data. A generative adversarial network (GAN) generally includes a generator and a discriminator. The generator's objective is to generate realistic samples to fool the discriminator. The discriminator's objective is to distinguish between real samples and fake samples synthesized by the generator. Different types of GANs have been attempted for music synthesis, text generation, human image synthesis, speech synthesis, and many other exciting applications.

Despite the significant progress in developing GANs, how different semantics are encoded in the latent space of GANs is not well-understood. Accordingly, it is still a challenge to perform conditioned image generation or editing with conventional GANs.

SUMMARY

This Summary is provided to introduce selected concepts that are further described below in the Detailed Description. This Summary is not intended to identify key features or essential features of the claimed subject matter, nor is it intended to be used as an aid in determining the scope of the claimed subject matter.

In general, this disclosure includes a technical solution for creating a new type of GAN with disentangled latent space, which can create improved AI-generated media in terms of semantic image generation or editing. In various embodiments, this new type of GAN is trained via an auxiliary network (AN) with an auxiliary task to determine whether two GAN-induced transformations are caused by the same perturbation code. By updating the learnable parameters of a GAN with an adversarial loss and an auxiliary loss, a new type of GAN is created with a disentanglement of semantics encoded in the latent space of the GAN, or more specifically, in the latent space of the generator of the GAN.

Furthermore, various systems, methods, and computer-readable storage devices are disclosed to improve a computing system's function for image processing in multiple aspects. Specifically, one technical purpose is to disentangle the latent space of the GAN. Among many aspects of technical characters described herein to serve the aforementioned technical purpose, one aspect of the technical characters includes adding a perturbation code to two latent codes in the latent space, connecting the AN with the GAN, determining the difference between respective feature representations of the two GAN-induced transformations, and training the GAN based on the difference between the respective feature representations of the two GAN-induced transformations. Resultantly, these technical characters lead to further technical effects, including generating or editing images in a specific semantic direction using this new type of GAN with disentangled latent space. Various other improvements over conventional image processing systems are further discussed in the Detailed Description below.

BRIEF DESCRIPTION OF THE DRAWINGS

The technologies described herein are illustrated by way of example and not limited by the accompanying figures in which like reference numerals indicate similar elements and in which.

DETAILED DESCRIPTION

Figure 1:
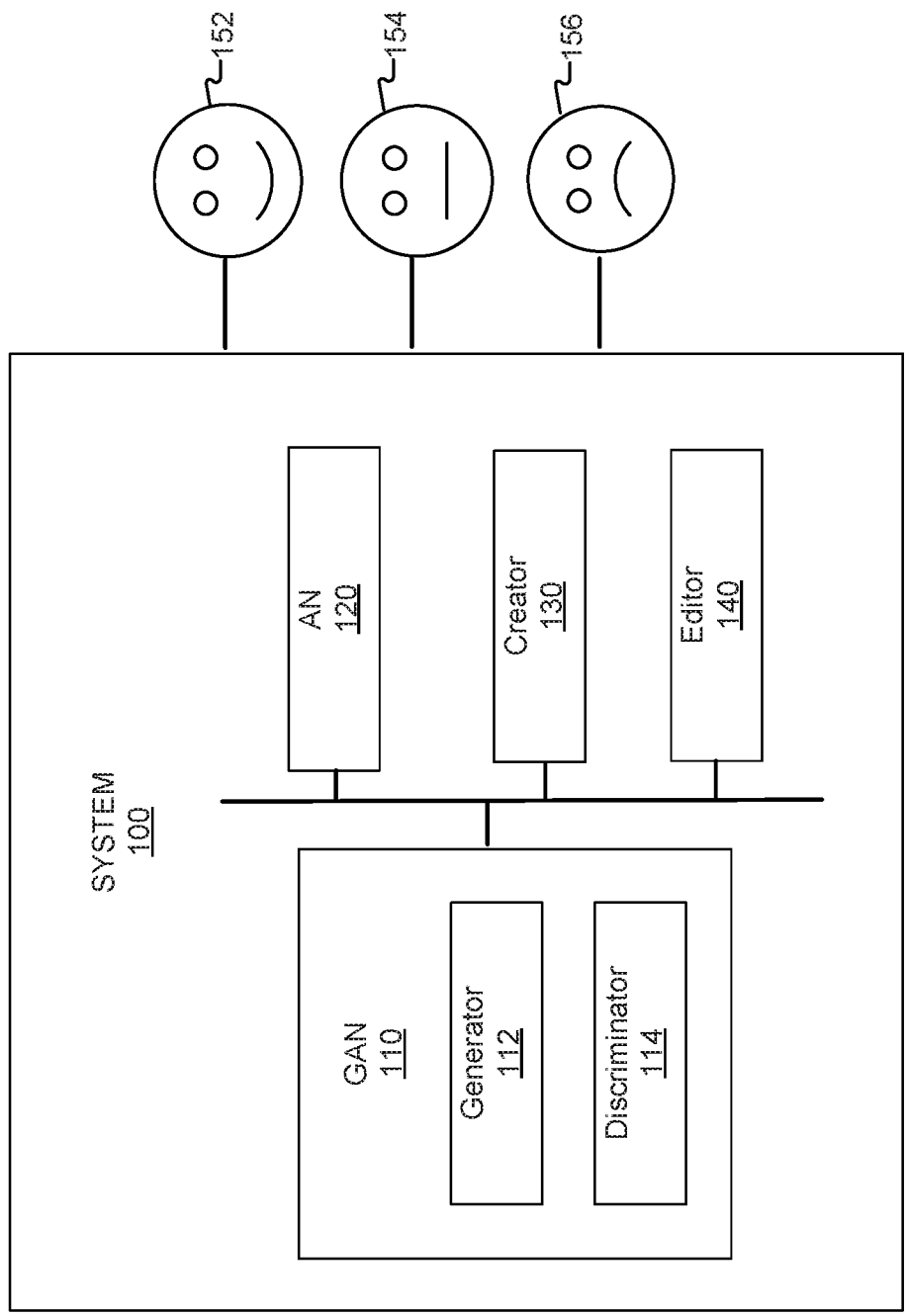
FIG. 1 is a schematic diagram of an exemplary system, in accordance with at least one aspect of the technologies described herein.

The various technologies described herein are set forth with sufficient specificity to meet statutory requirements. However, the description itself is not intended to limit the scope of this disclosure. Instead, the inventors have contemplated that the claimed subject matter might also be embodied in other ways, to include different steps or combinations of steps similar to the ones described in this document, in conjunction with other present or future technologies. Moreover, although the terms "step" or "block" may be used herein to connote different elements of methods employed, the terms should not be interpreted as implying any particular order among or between various steps herein disclosed unless and except when the order of individual steps is explicitly described. Further, the term "based on" generally denotes that the succedent object, data, or information is used in performing the precedent action.

This disclosure uses many terms of art in machine learning, including generative models, latent space, latent code, perturbation code, entanglement, disentanglement, semantic editing, semantic direction, etc. Latent space generally refers to a representation of compressed data. A generative model builds a latent space by learning compressed feature representations of the training data in the latent space. Feature representations of the input training data space can be used by the generative model to construct the latent space to represent the training data. The generative model learns the mapping from a latent distribution in the latent space to the real data through training so that a latent code sampled from the latent distribution can be decoded back to a realistic observable sample in the output space.

Latent codes are also known as latent vectors. Latent codes may also be said as data points in the latent space, e.g., a lower-dimensional representation of the features of an input image. A latent code could contain a hidden representation of a type of observable sample with certain attributes, such as shape or color. Similar latent codes are close in the latent space. Further, latent codes can be interpreted as continuous random variables in probabilistic terms.

Latent transformation detection (LTD) generally refers to the process of detecting latent transformations. Latent transformation generally refers to manipulating the latent codes in the latent space, e.g., with perturbation codes. Perturbation codes generally refer to noises that would cause latent codes to deviate from their previous places in the latent space. Both latent codes and perturbation codes may be sampled from a distribution, e.g., a normal distribution, a Gaussian distribution, etc. A latent code can be transformed into another latent code, e.g., by adding a perturbation code to the original latent code. The transformed latent code can be used to generate a transformed observable sample in the output space via the generative model, although the transformed latent code may or may not entirely fit with the original latent space.

Entanglement occurs when two features encoded in the latent space entangles a common dimension in the latent space. Resultantly, a latent space manipulation on the common dimension would affect both features. Disentanglement generally refers to the process of organizing the latent space so that the dimensions in the latent space can be separated to manipulate respective features. Resultantly, a feature can be manipulated independently in a disentangled latent space.

In a disentangled latent space, semantical directions correspond to respective semantic features. Such directions in the latent space are semantic because they correspond to human interpretable transformations. In a disentangled latent space, semantic editing (e.g., extrapolating or interpolating data points using vector arithmetic) along these semantic directions leads to more controllable generation processes, such as a generation process conditioned on a specific semantic feature, e.g., zoom, scale, shift, brightness, etc.

Further, this disclosure uses the following expressions interchangeably between "the latent space of the GAN" and "the latent space of the generator of the GAN," between "disentangling the latent space" and "disentangling the semantics encoded in the latent space," between "disentangled latent space" and "disentangled semantics in the latent space," and between "the auxiliary task" and "the LTD task."

Generative adversarial networks (GANs) have become a popular generative model in modeling complex data distributions, such as visual or audio data. For example, researchers have envisioned various GANs for music synthesis, text generation, human image synthesis, speech synthesis, and many other exciting applications. Generally, a generative adversarial network (GAN) refers to a machine learning framework that, given training data, learns to generate new data having the same or similar statistics as the training data. A GAN includes at least a generator and a discriminator. The generator learns a mapping from a latent distribution to the data distribution via adversarial training with the discriminator. The generator's objective is to generate realistic samples to fool the discriminator. The discriminator's objective is to distinguish between real samples and fake samples synthesized by the generator.

Despite the significant progress in developing GANs, the latent spaces in GANs are often entangled, and it is difficult to understand how semantics are encoded in an entangled latent space. Unless we understand how different semantics are encoded in the latent space or otherwise disentangle the semantics encoded in the latent space, it remains a challenge to perform conditioned image generation or editing with conventional GANs. As such, a new type of GAN with disentangled latent space needs to be developed to perform many conditioned image generation or editing tasks, e.g., editing an image in a configurable semantic direction.

There are some conventional approaches for latent space manipulation for semantic editing in GANs. One approach tried to compute linear directions corresponding to attribute change by using annotated attributes tags of the training images. Another approach tried to interpret visual properties from a source image to a target image based on interpolations in latent feature space of target and source images. Another approach tried to generate images belonging to a certain class based on labels for training the model. Another approach tried to learn disentangled representations by maximizing the mutual information between a subset of the latent codes. Another approach tried to learn the latent space directions corresponding to transformations (e.g., zoom, scale, shift, brightness, etc.) based on respective augmentations of images on pre-trained GAN models. This approach lightens the requirement of attribute tagged images. Another approach includes auto-encoding transformations (AET), which proposes to learn useful unsupervised feature representation by encoding the input data transformation rather than the data itself. Specifically, image transformation operators are sampled, and the objective is to estimate the transformation given the feature representation of the original and the transformed images. This framework of unsupervised feature learning encourages the encoding of the essential visual structure of the transformation so that the transformation can be predicted.

The performance of those existing approaches is generally limited by biases in the training dataset and respective models' generalization performance. Importantly, those existing approaches offer limited or no meaningful insight into encoding different semantics in the latent space or how to disentangle the semantics encoded in the latent space.

In this disclosure, a technical solution is provided to create a new type of GANs with disentangled latent space, which can be used to improve AI-generated media in terms of image generation or editing in a configurable semantic direction. At a high level, a GAN is trained with a self-supervised task, called the LTD task, to disentangle the semantics encoded in the latent space of the GAN. In various embodiments, the LTD task classifies GAN-induced transformations in a binary fashion, i.e., whether two GAN-induced transformations associated with two randomly generated images are the same or different. GAN-induced transformations refer to transformation induced in the generated images by manipulating or perturbing the latent space of a generator of the GAN.

Further, an auxiliary network (AN) with an auxiliary loss is designed to train the GAN to synthesize semantically consistent images by performing the LTD task. The auxiliary loss of the AN is designed to encourage the generator to produce images that are distinguishable by the AN, which in turn disentangles the latent space to the extent that the generator is trained to synthesize semantically consistent images with respect to GAN-induced transformations. More details are discussed in connection with various figures.

For instance, given two pairs of images where each pair comprises a generated image and its transformed version, the LTD task aims to determine whether the latent transformation applied in the given pair is the same as the other pair. Based on this determination, the auxiliary loss regulates the GAN to synthesize semantically consistent image transformations with respect to similar latent space perturbations, thus induces disentanglement of the latent space. Further, the LTD task also promotes useful representation learning because the features to represent the GAN-introduced transformations would have to encode sufficient information about visual structures of both the original and transformed images to perform the LTD task. More details are discussed in connection with various figures.

The LTD approach for training GANs is different from many existing self-supervised learning methods in various aspects. For example, many previous methods make use of limited predetermined augmentation or transformations (e.g., rotation, translation, etc.) to define the self-supervised loss. In contrast, the disclosed solution utilizes GAN-induced transformations to define the auxiliary loss. Further, in contrast to earlier methods that add a self-supervised loss to the discriminator, the LTD task regulates the generator to synthesize images such that the GAN-induced transformations are distinguishable at a feature representation level. This contrasts with the previous line of works that augments the input data to the discriminator using a fixed set of static transformations and penalizes the sensitivity of discriminatory features to these transformations.

Resultantly, in collaboration with the adversarial training of GANs, this novel self-supervised LTD task in connection with the AN trains a new type of GAN by classifying GAN-induced transformations. This novel training process also disentangles the semantics encoded in the latent space of the generator.

The new GAN improves the quality of conditional and unconditional image generation over prior state-of-the-art GANs. For example, experiments demonstrate the efficacy of this new GAN on several standard datasets (e.g., CIFAR-10, ImageNet, STL, CelebA-HQ) with various architectures (e.g., SNDCGAN, BigGAN, StyleGAN) by improving the conditional and unconditional image generation performance at least on, e.g., the Fréchet inception distance (FID) metric. For instance, one experiment with the new GAN achieved a high FID score of 9.8 on conditional CIFAR-10 image generation, which has significantly surpassed conventional approaches.

Further, the new GANs also improve conditioned semantic image editing tasks, such as making image transformations in a configurable semantic direction, e.g., a specific facial attribute of age, gender, smile expression, or eyeglasses. For example, experiments with the new GAN significantly improve conditioned image editing for CelebA-HQ and ImageNet datasets over baseline models due to the more steerable and disentangled latent space in the new GAN.

To empirically demonstrate that the disclosed solution helps to learn a more steerable latent space. Various experiments have been conducted on CelebA-HQ and ImageNet datasets. These experiments show that the new GAN can find better edit directions in the latent space corresponding to image transformations like translation, brightness, or scale.

In one experiment, to demonstrate that the disclosed LTD task helps achieve a more disentangled latent space, the InterFaceGAN framework is adopted to measure the correlation between synthesized facial attributes distributions of StyleGAN trained on CelebA-HQ dataset. Images are synthesized by randomly sampling the latent space. A pretrained ResNet50 facial attribute detector assigns attribute scores to synthesized images for four facial attributes, i.e., age, eyeglasses, gender, and smile. The correlation between two attributes is computed using their distribution observed over the synthesized images by treating each attribute score as a random variable. The formula to calculate the correlation between two attributes X and Y is $$\rho_{XY} = \frac{\text{Cov}(X, Y)}{\sigma_X \sigma_Y},$$

where Cov(•,•) denotes covariance and σ denotes standard deviation. Correlation values closer to zero indicate a more disentangled latent space. The correlation between attributes is closer to zero with the disclosed solution as compared to the baseline StyleGAN.

Further, the disentangled latent space enables perceptually smoother transitions in the image space when interpolating data points in the latent space, and thus gives lower perceptual path length. Various experiments demonstrate that the perceptual path lengths for both latent spaces Z and W are much shorter with the disclosed solution compared to the baseline StyleGAN.

The disclosed technologies, particularly the design of the LTD task to differentiate GAN-induced transformations, help the generator of the new GAN to learn steerable latent feature representation and synthesize high-fidelity images in controllable semantic directions.

Further, obtaining labeled data is expensive and difficult to scale for deep learning models. By using a self-supervised LTD task for training the GAN, the disclosed technologies also improve the efficacy of neural networks to model high-dimensional data distribution in general by requiring less data for training.

Additionally, the disclosed technologies are generally applicable to many types or categories of graphic design documents. The disclosed technologies may be integrated with many image editing platforms or solutions, such as Adobe Photoshop®, Adobe Illustrator®, Adobe InDesign®, Adobe Lightroom®, etc. Accordingly, the disclosed solution can empower the integrated image processing platform to edit images at a semantic level, such as scaling an image, modifying the brightness, shifting an image, altering the age/expression/pose of a person, etc.

Having briefly described an overview of the technologies, referring now to FIG. 1, which is a schematic diagram of an exemplary system for image processing. System 100 is configured to train GAN 110 and AN 120 together to create a steerable latent space in GAN 110, which means the semantics encoded in the latent space of GAN 110 are disentangled to an extent so that GAN 110 can generate a specific kind of GAN-induced transformation corresponding to a specific kind of perturbation in the latent space. As a result, after the training, creator 130 can improve the quality and diversity of conditional or unconditional image generation. Further, editor 140 can identify an accurate edit direction in the latent space corresponding to a specific image transformation required in a conditioned image editing task.

In various embodiments, GAN 110 is designed to model complex data distributions within image data. GAN 110 comprises generator 112 and discriminator 114. The objective of generator 112 is to generate realistic samples to fool discriminator 114. The objective of discriminator 114 is to distinguish between real samples and fake samples provided by generator 112. Generator 112 and discriminator 114 are trained alternatively in a min-max game until generator 112 can generate realistic samples that seem to have been plausibly taken from the original dataset.

In various embodiments, generator 112 and discriminator 114 are neural networks (NNs). Although a neural network may include any number of layers, for the purpose of illustration, a neural network may be described to have at least three operational layers, e.g., an input layer, a hidden layer, and an output layer. Each layer comprises neurons. The input layer neurons pass data to neurons in the hidden layer. Neurons in the hidden layer pass data to neurons in the output layer. The output layer then produces a classification, for example. Different types of layers and networks connect neurons in different ways. The objective of one type of layer (e.g., Convolutional, Relu, and Pool) is to extract features of the input volume, while the objective of another type of layer (e.g., Fully-connected and Softmax) is to classify based on the extracted features.

Generator 112 or discriminator 114 are deep neural networks in some embodiments, which means generator 112 or discriminator 114 has more than one hidden layer. Examples of neural networks that may be used with aspects of the technology described herein include, but are not limited to, multi-layer perceptron (MLP) networks, convolutional neural networks (CNN), recursive neural networks, recurrent neural networks, and long short-term memory (LSTM) (which is a type of recursive neural network). Some embodiments described herein use a convolutional neural network, but aspects of the technology are applicable to other types of multi-layer machine classification technology.

Some layers in generator 112 or discriminator 114 may include parameters (e.g., weights or biases), such as a convolutional layer, while others may not, such as the ReLU layers and pooling layers. In various embodiments, the parameters may be learned or updated during training, which will be further discussed below. Further, some of the layers may include additional hyper-parameters (e.g., learning rate, stride, epochs, kernel size, number of filters, type of pooling for pooling layers, etc.), such as a convolutional layer or a pooling layer, while other layers may not, such as a ReLU layer. Various activation functions may be used, including but not limited to, ReLU, leaky ReLU, sigmoid, hyperbolic tangent (tanh), exponential linear unit (ELU), etc. The parameters, hyper-parameters, or activation functions are not limited and may differ depending on the embodiment.

Although input layers, convolutional layers, pooling layers, ReLU layers, and fully connected layers are discussed herein, this is not intended to be limiting. For example, additional or alternative layers, such as normalization layers, softmax layers, or other layer types, may be used in generator 112 or discriminator 114.

Although some examples are described herein with respect to using neural networks, and specifically convolutional neural networks, this is not intended to be limiting. For example, and without limitation, system 100 may use any type of machine learning models, such as a machine learning model(s) using linear regression, logistic regression, decision trees, support vector machines (SVM), Naïve Bayes, k-nearest neighbor (KNN), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

AN 120 is configured to execute a self-supervised auxiliary task, which aims to determine whether respective latent transformations applied to a pair of transformed images are the same. The latent transformations are purposefully caused by adding perturbation codes to latent codes in the latent space of generator 112. An auxiliary loss is used in AN 120 to encourage generator 112 to produce images that are distinguishable by AN 120, which in turn promotes the synthesis of semantically consistent images with respect to latent transformations. Many aspects of AN 120 are further discussed in connection with the remaining figures.

Creator 130 is configured to improve the quality and diversity of conditional or unconditional image generation. GAN 110 becomes a new kind of GAN after being trained together with AN 120 as the semantics encoded in the latent space of GAN 110 are disentangled. This new kind of GAN is used by creator 130 to synthesize new images from an existing dataset. Unconditional image generation refers to generating samples unconditionally from the dataset. In an unconditioned generative setting, there is no control over modes of the data being generated. For example, generator 112 simply generates a sample from a noise distribution. Conditional image generation refers to generating samples conditionally from the dataset. In a conditioned generative setting, generator 112 generates a fake sample with a specific condition or characteristics, e.g., a label associated with an image. Further, there are technical differences between conditional and unconditional image generation in terms of the job of discriminator 114. Specifically, discriminator 114 determines whether the input image is real or fake under the unconditional model. Discriminator 114 may be configured to classify between real and fake of a tuple of the input sample and the generated sample with the condition. In both the conditional or unconditional settings, creator 130 improves the quality and diversity of image generation. For example, under the conditional generation setting, generator 112 can now more accurately generate images with a particular condition or attribute with its disentangled latent space.

After the training process, editor 140 can use generator 112 to find a more accurate semantic edit direction in the latent space corresponding to a specific image transformation (e.g., translation, brightness, zoom, scale, etc.) required in a conditioned image editing task. In one embodiment, editor 140 is commissioned to manipulate faces, such as changing attributes of the face, e.g., age, gender, smile, eyeglasses, etc. Editor 140 determines the latent code corresponding to transformed images.

Using the training data, including latent codes of original and transformed images regarding a particular attribute, editor 140 learns the latent code in the latent space corresponding to a particular attribute. To manipulate the image in the dimension of the particular attribute, editor 140 may move the latent code in different directions. By way of example, neutral face 154 is the original image. By moving the latent code corresponding to smile in a negative or positive direction, editor 140 can use generator 112 to produce happy face 152 and sad face 156.

System 100 is merely one example of a suitable computing environment and is not intended to suggest any limitation on the scope of use or functionality of aspects of the technologies described herein. Neither should this system be interpreted as having any dependency or requirement relating to any one component nor any combination of components illustrated. It should be understood that each of the components shown in system 100 may be implemented on any type of computing device, such as computing device 500 described in FIG. 5. Different components in system 100 may be distributed to different physical devices. Further, a component may communicate with another component or various external devices via a network, which may include, without limitation, a local area network (LAN) or a wide area network (WAN).

It should be understood that this arrangement in system 100 is set forth only as an example. Other arrangements and elements (e.g., machines, networks, interfaces, functions, orders, and grouping of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combinations and locations. Further, various functions described herein as being performed by an entity may be carried out by hardware, firmware, or software. For instance, some functions may be carried out by a processor executing special instructions stored in memory, such as LTD logic 522 of FIG. 5.

Figure 2:
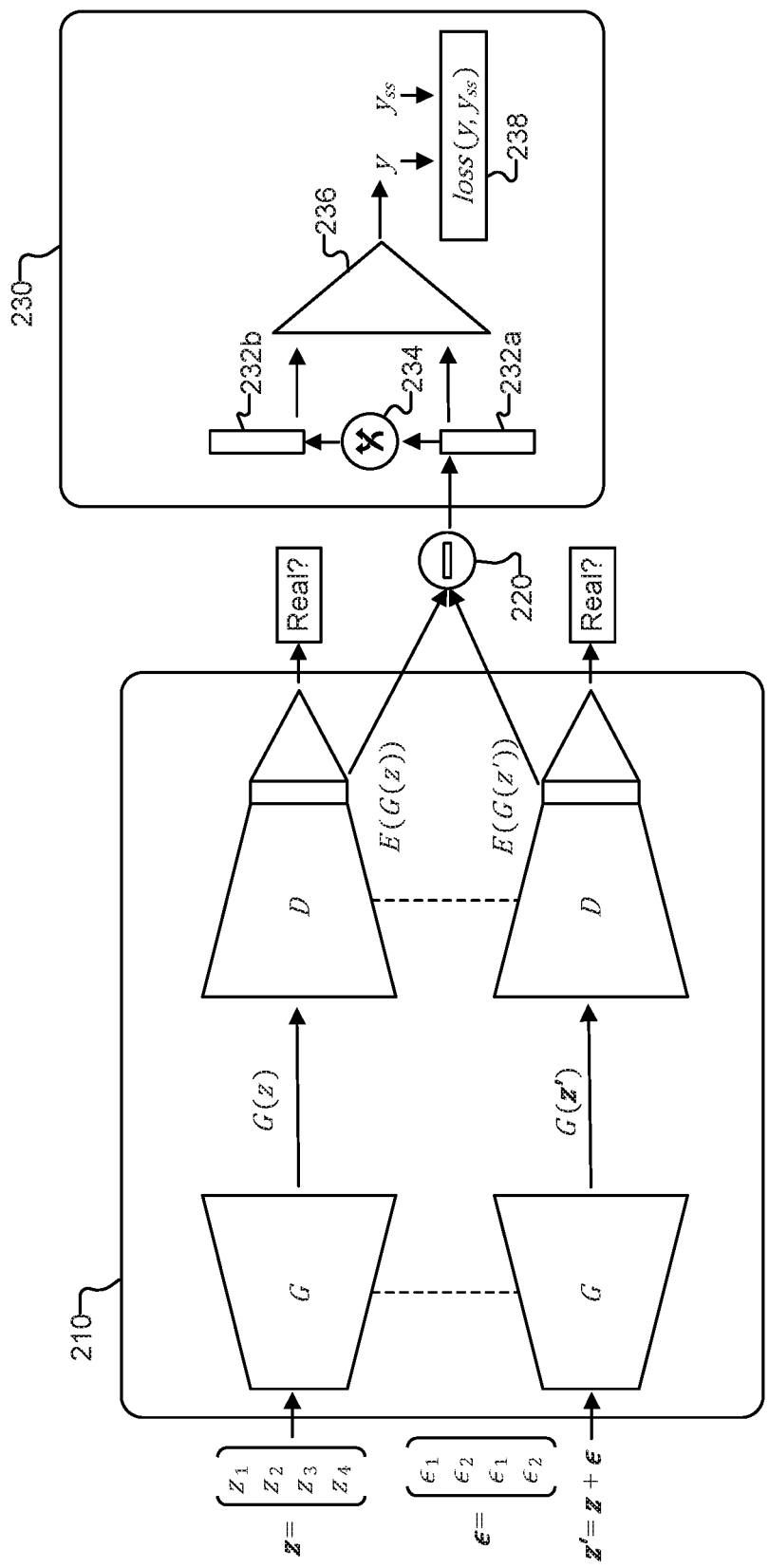
FIG. 2 is a schematic representation illustrating an exemplary process for training the exemplary system, in accordance with at least one aspect of the technologies described herein.

Referring now to FIG. 2, FIG. 2 illustrates an exemplary process for training the exemplary system, e.g., system 100 in FIG. 1. In this embodiment, the training process of GAN 210 leverages the LTD task to disentangle the semantics encoded in the latent space. This LTD task is originated from the latent space of GAN 210 and regulated by AN 230. For example, perturbation codes ($\epsilon$) are added to latent codes (z) in the latent space to induce transformations. AN 230 is operatively connected to the discriminators of GAN 210. AN 230 is configured to distinguish among different GAN-induced transformations, particularly to determine whether two GAN-induced transformations are caused by a common perturbation code. Auxiliary loss 238 in AN 230 is further configured to regulate GAN 210 to induce the same kind of transformation for a common perturbation code.

GAN 210 comprises a generator (G) to generate samples (represented by G:z→x) and a discriminator (D) to determine whether a sample is real or fake (represented by D:x→$\mathbb{R}$). G learns a mapping from the latent code $z \in \mathbb{R}^d$ sampled from a prior distribution p(z) to an observation $x \in \mathbb{R}^n$, e.g., a natural image manifold. D's role is to differentiate between samples from real data distribution p(x) and the ones generated from G. In some embodiments, the training of GAN involves minimizing the following loss function in Eq. 1 in an alternating fashion. This loss function is also known as non-saturating loss.

$$L_D := -\mathbb{E}_{x \sim p(x)}[\log(D(x))] - \mathbb{E}_{x \sim p(z)}[1 - \log(D(G(z)))]$$

$$L_G := -\mathbb{E}_{z \sim p(z)}[\log(D(G(z)))] \quad (1)$$

In some embodiments, the hinge loss in Eq. 2 is used to improve the training of GAN 210.

$$L_D : \mathbb{E}_{x \sim p(x)}[1 - D(x)]_+ + \mathbb{E}_{x \sim p(z)}[1 + D(G(z))]_+$$

$$L_G := -\mathbb{E}_{z \sim p(z)}[D(G(z))] \quad (2)$$

where $[y]_+ = \max(0, y)$

Here, latent code z is usually sampled from a normal distribution, and for each step of generator update, the discriminator is updated for $d_{step}$ times. In some embodiments, one or more stabilization techniques, e.g., spectral normalization, are used for stable training.

Referring back to the overall training process, the generator G in GAN 210 generates images G(z) and its GAN-induced transformation G(z+$\epsilon$). G(z) and G(z+$\epsilon$) are used for defining auxiliary loss 238, which is discussed below. Given intermediate discriminator features of generated images, i.e., E(G(z)) and E(G(z+$\epsilon$)), the feature representation of the GAN-induced transformation $f(z, z+\epsilon)$ can be obtained via subtraction operator 220 operated on E(G(z)) and E(G(z+$\epsilon$)). Then, AN 230 and GAN 210 are trained simultaneously under the LTD task to predict whether two features are generated from the same perturbation $\epsilon$ in the latent space. In some embodiments, the feature representations of various GAN-induced transformations are shuffled via shuffle operator 234 before classifier 236 determines whether feature 232a and feature 232b are generated from the same perturbation code E in the latent space. In one instance, feature 232a is $f(z_1, z_1+\epsilon_1)$ and feature 232b is $f(z_2, z_2+\epsilon_2)$. Accordingly, they would be classified as different GAN-induced transformations generated from different perturbation codes. In another instance, feature 232a is $f(z_1, z_1+\epsilon_1)$ and feature 232b is $f(z_2, z_2+\epsilon_1)$. Accordingly, they would be classified as the same type of GAN-induced transformations generated from a common perturbation code.

In some embodiments, AN 230 comprises a two-layer fully connected network with ReLU activation at the hidden layer and sigmoid activation at the output. Let the features E(G(z)) extracted from the discriminator network be shape C×H×W. The input layer of A is of 2×C×H×W dimension after flattening and concatenating the features. The hidden layer is of C dimension. The self-supervised task is introduced after n warmup iterations of training using the standard GAN loss to ensure that the generated images and its transformations are closer to the natural image manifold.

In various embodiments, AN 230 and the self-supervised task (i.e., LTD with GAN-induced transformation) are added to the training process to improved the steerability in the latent space by disentangling the latent space. Given a latent code z sampled from a prior distribution p(z) and the corresponding generated image I=G(z), GAN-induced transformation is defined by Eq. 3.

$$\mathcal{T}_\epsilon(G(z)) = G(z+\epsilon) : \epsilon \sim p(\epsilon) \quad (3)$$

For a fixed generator, the transformation $\mathcal{T}$ is parametrized by $\epsilon$, a perturbation of small magnitude, sampled from distribution p($\epsilon$). Applying $\mathcal{T}_\epsilon$ to the image I generated from latent code (z) generates a transformed version of the image ($\mathcal{T}_\epsilon(I)$). The LTD task aims to enforce that when a transformation $\mathcal{T}$ parametrized by an E is applied to latent codes, the change (e.g., translation, background change, etc.) from original to transformed images are semantically consistent across all generated images. In other words, a common perturbation should cause the same type of changes in transformed images after the training.

In some embodiments, operator 220 is configured to determine the difference between two instances of GAN-induced transformations. Let E:x→E(x) be an encoder network to extract the features of an image. The feature representation of a given transformation $\mathcal{T}_\epsilon$ can be quantified as the difference between the original and transformed images, as shown in Eq. 4.

$$f : [E(G(z)), E((\mathcal{T}_\epsilon(G(z)))] \rightarrow f(z, z+\epsilon) \quad (4)$$

In Eq. 4, the function of E( ) can choose any of the intermediate layer feature activations of the discriminator. For example, E(G(z)) represents the feature activation of the last layer of the discriminator in some embodiments but an intermediate layer of the discriminator in other embodiments. Further, a combination of multiple layer feature activations may also be used in other embodiments. For example, the last layer activation and the second last layer activation are combined in one embodiment for the function of E( ).

Meanwhile, the function $f$( ) can perform subtraction in some embodiments and concatenation in other embodiments. Specifically, the features produced according to Eq.

4 can be the subtraction or the concatenation between $E(G(z))$ and $E((\mathcal{T}_\epsilon(G(z))$, depending on the embodiment.

Given a pair of feature representations of latent transformations, e.g., $f(z_1, z_1+\epsilon_1)$ and $f(z_2, z_2+\epsilon_2)$, classifier 236 in AN 230 (A) classifies whether the feature representations correspond to transformations parameterized by the same perturbation code or different perturbation codes. Specifically, auxiliary loss 238 is defined in Eq. 5 in some embodiments, where L is standard binary cross-entropy loss and $y_{ss}$ is one (1) if $\epsilon_1$ is equal to $\epsilon_2$, otherwise zero (0).

$$L_A = \mathbb{E}_{z_1, z_2 \sim p(z), \epsilon_1, \epsilon_2 \sim p(\epsilon)} L(A([f(z_1, z_1+\epsilon_1), f(z_2, z_2+\epsilon_2)]), y_{ss}) \quad (5)$$

$$y_{ss} = (\epsilon_1 == \epsilon_2)$$

Accordingly, the overall training objective is summarized in Eq. 6. Here, λ denotes the weight of auxiliary loss 238. In some embodiments, p(z) and p(ϵ) are both chosen to be normal distributions with standard deviations $\sigma_z$ and $\sigma_\epsilon$ respectively, where $\sigma_\epsilon < \sigma_z$.

$$L_G := \mathbb{E}_{z \sim p(z) \epsilon \sim p(\epsilon)}[D(G(z))D(\mathcal{T}_\epsilon(G(z)))] + \lambda \cdot L_A$$

$$L_D: \mathbb{E}_{x \sim p(x)}[1-D(x)] + \mathbb{E}_{z \sim p(z) \epsilon \sim p(\epsilon)}([1+D(G(z))]_+ + [1+D(\mathcal{T}_\epsilon(G(z)))]_+) \quad (6)$$

During training with auxiliary loss 238, generator G and the auxiliary network A are updated simultaneously, alternating with discriminator updates. This process is further discussed in connection with FIG. 4. Further, hyper-parameter $\sigma_\epsilon$ regulates the difficulty of the self-supervision task. A large value of $\sigma_\epsilon$ makes the self-supervision task trivial as it is easier to distinguish between latent space perturbations that are far apart. In contrast, a smaller value of $\sigma_\epsilon$ makes the task too difficult and may cripple training. Hyper-parameter λ controls the ratio of weight assigned to self-supervision loss and adversarial loss in the generator's objective function. One embodiment sets $\sigma_\epsilon$ as 0.5 and λ as 1.0. Further, in some embodiments, the discriminator is trained to predict fake samples on GAN-induced transformations to balance the min-max training between the generator and the discriminator.

Figure 3:
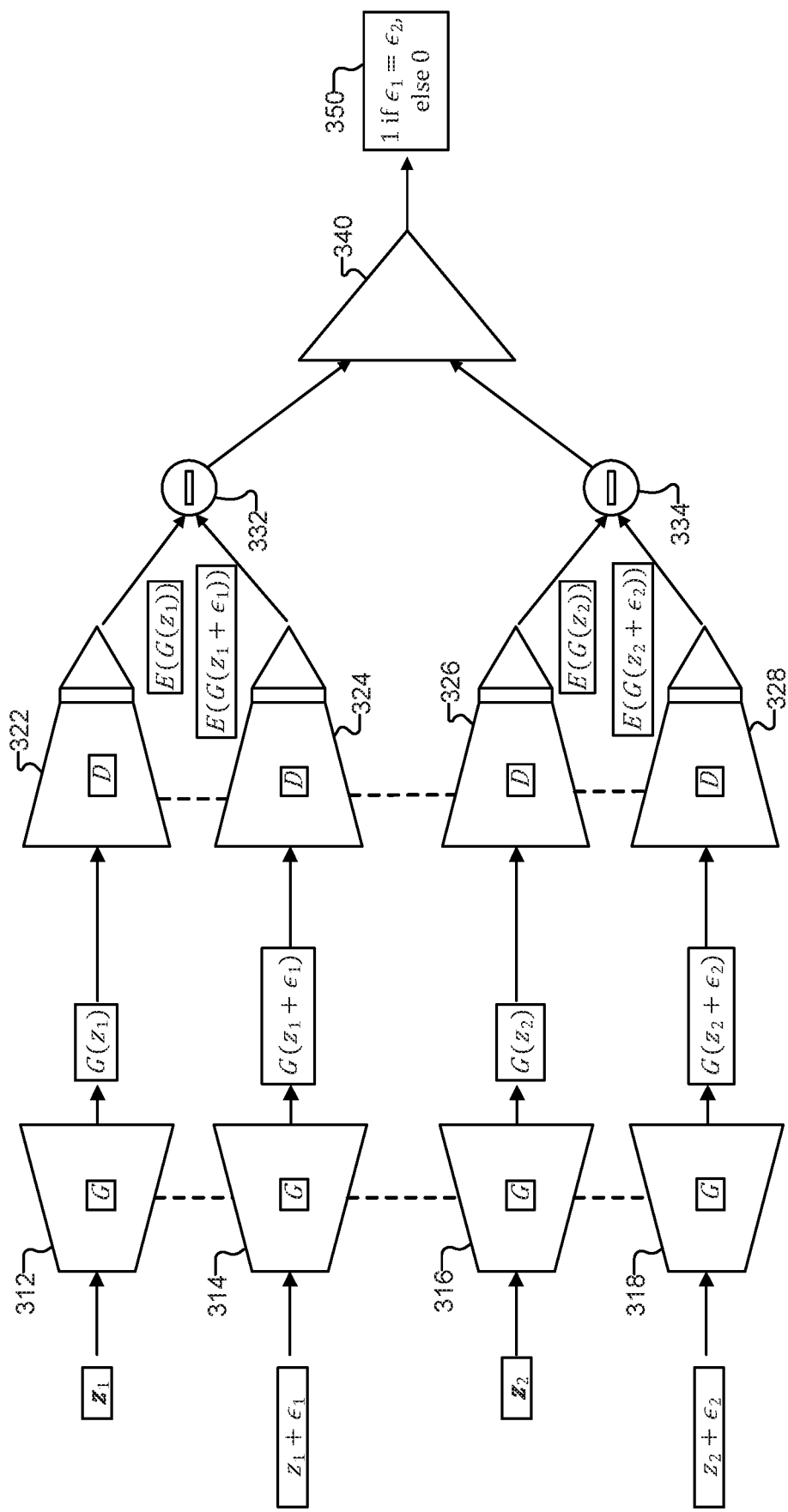
FIG. 3 is a schematic representation illustrating an exemplary process for predicting whether two transformations are caused by a common perturbation, in accordance with at least one aspect of the technologies described herein.

FIG. 3 illustrates an exemplary process for predicting whether two transformations are caused by a common perturbation. In this embodiment, generator 312 generates sample $G(z_1)$ from latent code $z_1$. Further, generator 314 generates sample $G(z_1+\epsilon_1)$ after perturbation code $\epsilon_1$ added to latent code $z_1$. Similarly, generator 316 generates sample $G(z_2)$ from latent code $z_2$, and generator 318 generates sample $G(z_2+\epsilon_2)$ after perturbation code $\epsilon_2$ added to latent code $z_2$.

Via subtraction operator 332, the feature representation of the GAN-induced transformation $f(z_1, z_1+\epsilon_1)$ is computed from the difference between features $(E(G(z_1)))$ derived from sample $G(z_1)$ by discriminator 322 and features $(E(G(z_1+\epsilon_1)))$ derived from sample $G(z_1+\epsilon_1)$ by discriminator 324.

Similarly, the feature representation of the GAN-induced transformation $f(z_2, z_2+\epsilon_2)$ is computed from the difference between features $(E(G(z_2)))$ derived from sample $G(z_2)$ by discriminator 326 and features $(E(G(z_2+\epsilon_2)))$ derived from sample $G(z_2+\epsilon_2)$ by discriminator 328 is obtained via subtraction operator 334.

Classifier 340 determines whether $f(z_1, z_1+\epsilon_1)$ and $f(z_2, z_2+\epsilon_2)$ are the same kind of GAN-induced transformation. Referring back to Eq. 5, for output 350, if $\epsilon_1$ is equal to $\epsilon_2$, which means they are the same perturbation code, then $y_{ss}$ is set to 1; otherwise $y_{ss}$ is set to 0. Then $y_{ss}$ is used to calculate the binary cross-entropy loss in Eq. 5.

In some embodiments, the GAN as illustrated in FIG. 3 includes multiple generators (e.g., generator 312, generator 314, generator 316, and generator 318) with shared weights and other learnable parameters. Similarly, the GAN includes corresponding discriminators (e.g., discriminator 322, discriminator 324, discriminator 326, and discriminator 328) with shared weights and other learnable parameters.

In other embodiments, the GAN has one generator and one discriminator. The output from the generator and the discriminator are buffered. Accordingly, classifier 340 can perform the LTD task, which is to compare and determine whether respective feature representations of two GAN-induced transformations are caused by a common perturbation in the latent space.

Figure 4:
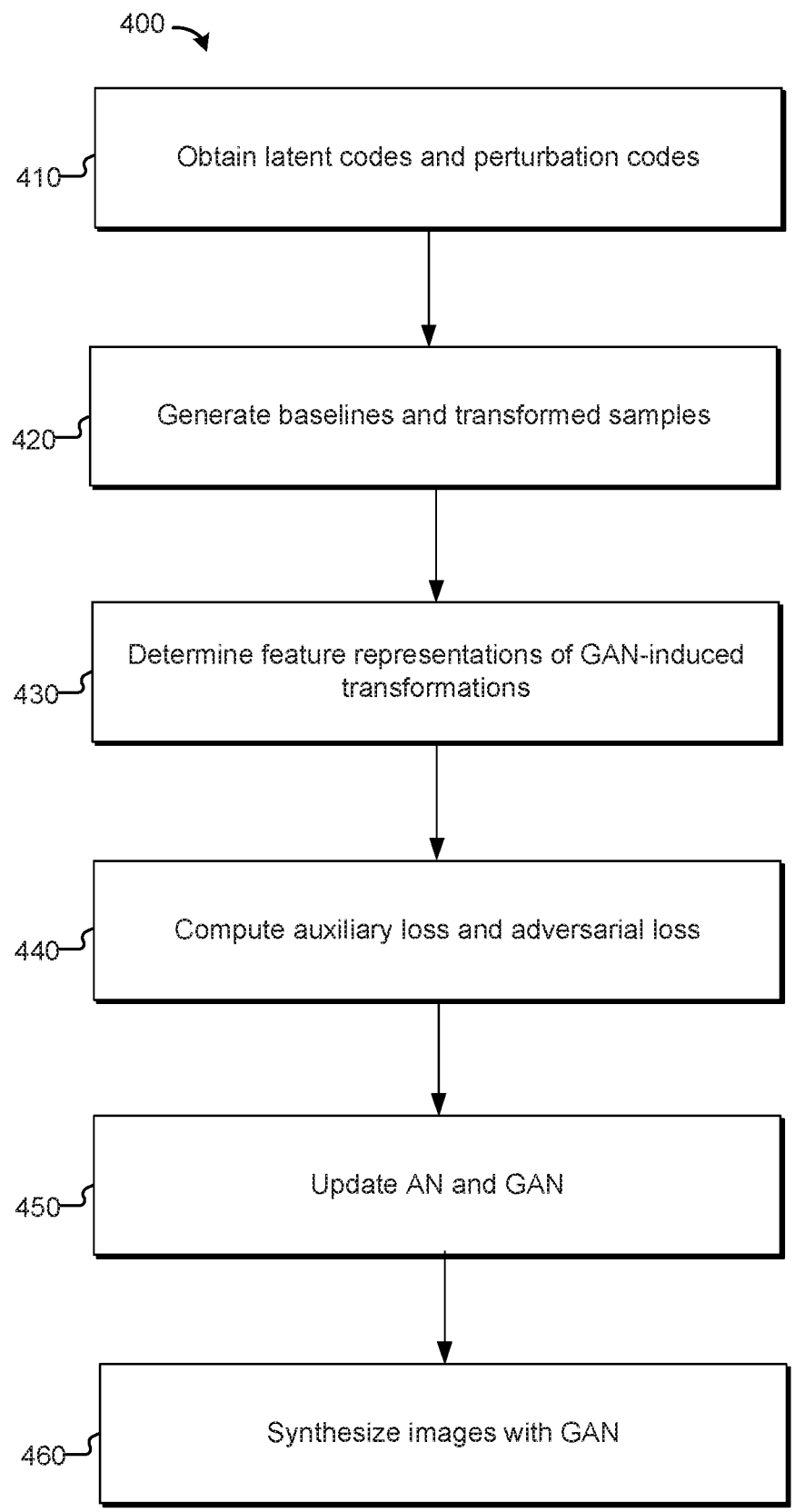
FIG. 4 is a flow diagram illustrating an exemplary process of image generation and editing with latent transformation detection, in accordance with at least one aspect of the technologies described herein.

FIG. 4 is a flow diagram illustrating an exemplary process of image generation and editing with latent transformation detection, e.g., performed by system 100 of FIG. 1. Each block of process 400, and other processes described herein, comprises a computing process that may be performed using any combination of hardware, firmware, or software. For instance, various functions may be carried out by a processor executing instructions stored in memory. The process may also be embodied as computer-usable instructions stored on computer storage media or devices. The process may be executed by a device, a standalone application or app, a computing service, or in any combinations thereof.

Some blocks of process 400 correspond to some parts of Algorithm 1 below, which further illustrates the training process with an exemplary pseudo-code of training.

---

Algorithm 1

---

Input:
    Generator, Discriminator, and Auxiliary network
    parameters $\theta_G$, $\theta_D$ and $\theta_A$.
    Batch size 2b,
    weight of self-supervision loss λ,
    standard deviation $\sigma_\epsilon$ of normal distribution p(ϵ),
    discriminator update steps $d_{step}$ for each generator update,
    Adam hyperparemters α, $\beta_1$, $\beta_2$.
BEGIN
    FOR number of training iterations DO
        FOR t: 1 . . . $d_{step}$ DO
            Sample batch x ~ $p_{data}(x)$
            Sample $\{z^{(i)}, \epsilon^{(i)}\}_{i=1}^b$ ~ p(z), p(ϵ)
            z = $\{z^{(i)}\}_{i=1}^b \cup \{z^{(i)} + \epsilon^{(i)}\}_{i=1}^b$
            $L_D = [1 - D(x)]_+ + [1 + D(G(z))]_+$
            Update $\theta_D \leftarrow Adam(L_D, \alpha, \beta_1, \beta_2)$
        END
        Sample z = $\{z^{(i)}\}_{i=1}^{2b}$ ~ p(z), $\epsilon_1, \epsilon_2$ ~ p(ϵ)
        ϵ = [$\epsilon_1, \epsilon_2$]. repeat(b) (repeat along batch dimension)
        Generate images G(z)
        Generate GAN-induced transformation G(z + ϵ)
        f (z, z + ϵ) = E(G(z)) − E(G(z + ϵ))
        shuffle ( ) = permutation(2b)
        $L_A$ = L(A([f(z, z + ϵ), f (z, z + ϵ). shuffle ( )]), $y_{ss}$)
        $y_{ss}$ = (ϵ = = ϵ.shuffle( ))
        $L_G$ = −D(G(z)) − D(G(z + ϵ))
        Update $\theta_A \leftarrow Adam(L_A, \alpha, \beta_1, \beta_2)$
        Update $\theta_G \leftarrow Adam((L_G + \lambda.L_A), \alpha, \beta_1, \beta_2))$
    END
END

---

At block 410, the process is to obtain latent codes and perturbation codes. In various embodiments, both latent codes and perturbation codes are sampled from a prior distribution, e.g., p(z) and p(ϵ), as discussed in connection with FIG. 2. The pseudo-code (Sample $\{z^{(i)}, \epsilon^{(i)}\}_{i=1}^b$ ~ p(z), p(ϵ)) in Algorithm 1 refers to the step of sampling a batch of latent codes of size b and noise codes from a distribution (e.g., normal distribution) of size b. In various embodiments, perturbation codes are sampled with a magnitude less than that of latent codes.

At block 420, the process is to generate baseline samples and transformed samples. In various embodiments, the GAN generates baseline samples from latent codes and transformed samples by adding respective perturbation codes to respective latent codes, as illustrated in FIG. 3. In Algorithm 1, this part of the process is represented by "Generate images G(z)" and "Generate GAN-induced transformation G(z+∈)." In some embodiments, this part of the process comprises generating a pair of baseline images from the GAN based on a pair of latent codes and generating a pair of transformed images from the GAN based on additions of respective perturbation codes to the pair of latent codes.

At block 430, the process is to determine feature representations of GAN-induced transformations. The feature representation of a given transformation $\mathcal{T}_\epsilon$ can be quantified as the difference between the original and transformed images, as shown in Eq. 4. In Algorithm 1, this part of the process is represented by "$f(z, z+\epsilon)=E(G(z))-E(G(z+\epsilon))$." In various embodiments, the AN is configured to determine a difference between respective feature representations of two GAN-induced transformations. Further, the AN is trained to promote the generators to generate images such that GAN-induced transformations are distinguishable at a feature representation level.

At block 440, the process is to compute auxiliary loss and adversarial loss to train the GAN. The auxiliary loss and adversarial loss for training the GAN may be computed based on Eq. 5 and Eq. 6. In Algorithm 1, "shuffle( )= permutation(2b)" refers to creating a random permutation of feature representations of GAN-induced transformations based on numbers ranging from 1 to 2b. "$y_{ss}=(\epsilon == \epsilon.\text{shuffle}(\ ))$" refers to computing the auxiliary label $y_{ss}$ using the criterion of equality between E and its shuffled version ∈.shuffle( ). Accordingly, the auxiliary loss is computed by "$L_A=L(A[f(z, z+\epsilon), f(z, z+\epsilon).\text{shuffle}(\ )], y_{ss})$." The adversarial loss for the generator is computed by "$L_G=-D(G(z))-D(G(z+\epsilon))$." The adversarial loss for the discriminator is computed by "$L_D=[1-D(x)]_++[1+D(G(z))]_+$".

In some embodiments, the auxiliary loss is computed based on respective differences between a pair of baseline images and a corresponding pair of transformed images. In some embodiments, the auxiliary loss is computed based on the difference between the respective feature representations of two GAN-induced transformations. In some embodiments, the auxiliary loss is computed based on a prediction of whether a pair of GAN-induced latent transformations are caused by the same perturbation in the latent space.

At block 450, the process is to update the AN and GAN. In Algorithm 1, "Update $\theta_A \leftarrow \text{Adam}(L_A, \alpha, \beta_1, \beta_2)$" refers to updating the learnable parameters of the auxiliary network using auxiliary loss. "Update $\theta_G \leftarrow \text{Adam}((L_G+\lambda \cdot L_A), \alpha, \beta_1, \beta_2)$" refers to updating the learnable parameters of the generator using both adversarial and auxiliary loss. "Update $\theta_D \leftarrow \text{Adam}(L_D, \alpha, \beta_1, \beta_2)$" refers to updating the learnable parameters of the discriminator using the adversarial loss for the discriminator.

Updating the AN and GAN includes training the AN and GAN together. In various embodiments, the AN and the GAN are trained together with a self-supervised task, which includes adding different latent space perturbations to induce different GAN-induced latent transformations. The AN and the GAN are trained together with an adversarial loss and an auxiliary loss. The auxiliary loss is configured to cause a disentanglement of semantics encoded in the latent space of the GAN.

In various embodiments, training the GAN is based on the difference between the respective feature representations of two GAN-induced transformations. The training process disentangles the latent space of the GAN based on a prediction of whether the two GAN-induced transformations are caused by a common perturbation code. The common perturbation code is a perturbation code being added to a latent code in the latent space. In various embodiments, the AN regulates the training so that the GAN can be trained to generate the same type of image transformation on training images when the common perturbation code is added to different latent codes in the latent space of the GAN.

At block 460, the process is to synthesize images with the trained GAN. In some embodiments, the generators are trained to generate image variations based on source images. In some embodiments, the generators are trained to generate an image transformation at a semantic direction in response to a semantic edit request. The semantic edit request comprises altering an image of a person in a semantic direction of age, expression, or pose.

As discussed earlier, this new GAN improves conditional (labeled data) and unconditional (unlabeled data) image generations. In some embodiments, the disclosed system (e.g., system 100) generates a new set of synthesized images with mixed visual features adopted from a set of images that are provided by users. For example, an apparel company's creative designer can upload some images of a particular dress design. The disclosed system then generates different variations of images from the given images for inspiration and aiding the creative process of designing a new set of apparel clothes for the next season. As another example, the disclosed system can enable marketers to communicate effectively by including synthesized images to illustrate the marketing idea.

Meanwhile, generating images with the trained GAN also comprises applications of semantic editing as the trained GAN can find more accurate edit directions in the latent space corresponding to semantic image transformations like translation, brightness, and scale. In various embodiments, in response to a request for a semantic edit (e.g., adding more smile), the disclosed system generates an image transformation (e.g., the new face with more smile) corresponding to the semantic edit.

For semantic editing, various experiments demonstrate that the latent space of the trained GAN is highly steerable. In one experiment, the disclosed technologies resulted in smoother and more meaningful transformations in the image space while preserving the content of the image and avoiding distortions at the extremes. In one experiment, the disclosed technologies improved the accuracy of semantic editing on various facial attributes (e.g., age, eyeglasses, gender, expression, etc.).

Accordingly, various aspects of the technologies for generating layout variations have been disclosed herein. It is understood that various features, sub-combinations, and modifications of the embodiments described herein are of utility and may be employed in other embodiments without reference to other features or sub-combinations. Moreover, the order and sequences of steps/blocks shown in the above example processes are not meant to limit the scope of the present disclosure in any way, and in fact, the steps/blocks may occur in a variety of different sequences within embodiments hereof. Such variations and combinations thereof are also contemplated to be within the scope of embodiments of this disclosure.

Figure 5:
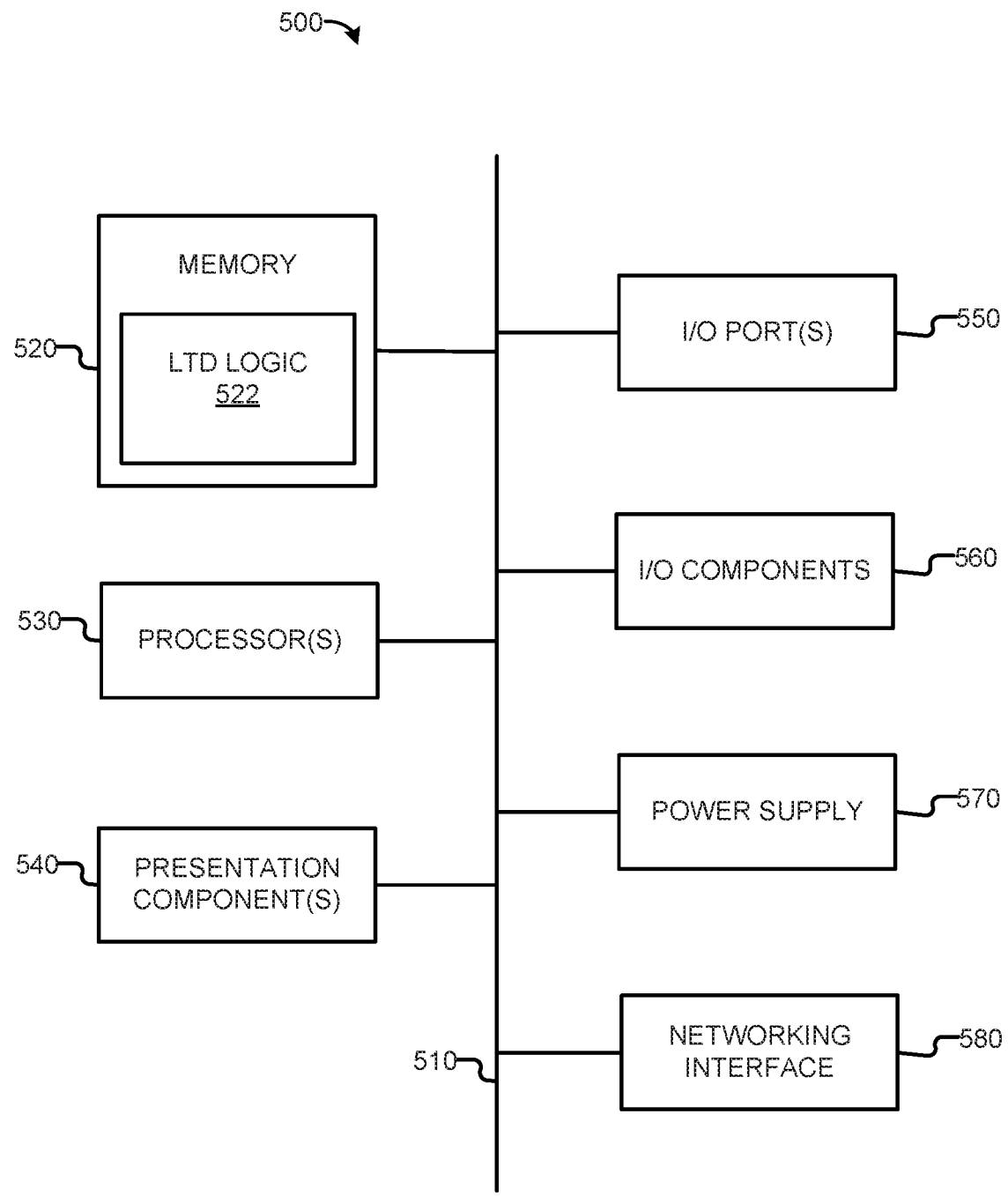
FIG. 5 is a block diagram of an exemplary computing environment suitable for implementing various aspects of the technologies described herein.

Referring to FIG. 5, an exemplary operating environment for implementing various aspects of the technologies described herein is shown and designated generally as computing device 500. Computing device 500 is but one example of a suitable computing environment and is not intended to suggest any limitation as to the scope of use of the technologies described herein. Neither should the computing device 500 be interpreted as having any dependency or requirement relating to any one or combination of components illustrated.

The technologies described herein may be described in the general context of computer code or machine-useable instructions, including computer-executable instructions such as program components being executed by a computer or other machine. Generally, program components, including routines, programs, objects, components, data structures, and the like, refer to code that performs particular tasks or implements particular abstract data types. The technologies described herein may be practiced in a variety of system configurations, including handheld devices, consumer electronics, general-purpose computers, and specialty computing devices, etc. Aspects of the technologies described herein may also be practiced in distributed computing environments where tasks are performed by remote processing devices that are connected through a communications network.

With continued reference to FIG. 5, computing device 500 includes a bus 510 that directly or indirectly couples the following devices: memory 520, processors 530, presentation components 540, input/output (I/O) ports 550, I/O components 560, and an illustrative power supply 570. Bus 510 may include an address bus, data bus, or a combination thereof. Although the various blocks of FIG. 5 are shown with lines for the sake of clarity, delineating various components is not so clear in various embodiments, and metaphorically, the lines would more accurately be grey and fuzzy. For example, one may consider a presentation component such as a display device to be an I/O component. The inventors hereof recognize that such is the nature of the art and reiterate that the diagram of FIG. 5 is merely illustrative of an exemplary computing device that can be used in connection with different aspects of the technologies described herein. The distinction is not made between such categories as "workstation," "server," "laptop," "handheld device," etc., as all are contemplated within the scope of FIG. 5 and refers to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technologies for storage of information such as computer-readable instructions, data structures, program modules, or other data.

Computer storage media includes RAM, ROM, EEPROM, flash memory or other memory technologies, CD-ROM, digital versatile disks (DVD) or other optical disk storage, magnetic cassettes, magnetic tape, magnetic disk storage, or other magnetic storage devices. Computer storage media does not comprise a propagated data signal. A computer-readable device or a non-transitory medium in a claim herein excludes transitory signals.

Communication media typically embodies computer-readable instructions, data structures, program modules, or other data in a modulated data signal such as a carrier wave or other transport mechanism and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 520 includes computer storage media in the form of volatile and/or nonvolatile memory. The memory 520 may be removable, non-removable, or a combination thereof. Exemplary memory includes solid-state memory, hard drives, optical-disc drives, etc. Computing device 500 includes processors 530 that read data from various entities such as bus 510, memory 520, or I/O components 560. Presentation component(s) 540 present data indications to a user or another device. Exemplary presentation components 540 include a display device, speaker, printing component, vibrating component, etc. I/O ports 550 allow computing device 500 to be logically coupled to other devices, including I/O components 560, some of which may be built-in.

In various embodiments, memory 520 includes, in particular, temporal and persistent copies of LTD logic 522. LTD logic 522 includes instructions that, when executed by processor 530, result in computing device 500 performing functions, such as but not limited to, process 400, its sub-processes, or other processes described herein. In various embodiments, LTD logic 522 includes instructions that, when executed by processors 530, result in computing device 500 performing various functions associated with, but not limited to various components in connection with system 100 in FIG. 1, such as generator 112, discriminator 114, AN 120, creator 130, or editor 140. For example, in one embodiment, processors 530, operationally connected to GAN 110 and the AN 120, is configured to execute instructions to train GAN 110 and the AN 120 to cause a disentanglement of a latent space of generator 112 based on a prediction of whether two GAN-induced transformations are caused by a common perturbation in the latent space.

In some embodiments, processors 530 may be packed together with LTD logic 522. In some embodiments, processors 530 may be packaged together with LTD logic 522 to form a System in Package (SiP). In some embodiments, processors 530 can be integrated on the same die with LTD logic 522. In some embodiments, processors 530 can be integrated on the same die with LTD logic 522 to form a System on Chip (SoC).

Illustrative I/O components include a microphone, joystick, gamepad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 530 may be direct or via a coupling utilizing a serial port, parallel port, system bus, or other interface known in the art. Furthermore, the digitizer input component may be a component separate from an output component, such as a display device. In some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technologies described herein.

I/O components 560 include various graphical user interfaces (GUIs), which allow users to interact with computing device 500 through graphical elements or visual indicators, such as to interact with system 100 in FIG. 1. Interactions with a graphic user interface (GUI) are usually performed through direct manipulation of graphical elements in the GUI. Generally, such user interactions may invoke the business logic associated with respective graphical elements in the GUI. Two similar graphical elements may be associated with different functions, while two different graphical elements may be associated with similar functions. Further, the same GUI may have different presentations on different computing devices, such as based on the different graphical processing units (GPUs) or the various characteristics of the display.

Computing device 500 may include networking interface 580. The networking interface 580 includes a network interface controller (NIC) that transmits and receives data. The networking interface 580 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 580 may include a wireless terminal adapted to receive communications and media over various wireless networks. Computing device 500 may communicate with other devices via the networking interface 580 using radio communication technologies. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using various wireless networks, including 1G, 2G, 3G, 4G, 5G, etc., or based on various standards or protocols, including General Packet Radio Service (GPRS), Enhanced Data rates for GSM Evolution (EDGE), Global System for Mobiles (GSM), Code Division Multiple Access (CDMA), Time Division Multiple Access (TDMA), Long-Term Evolution (LTE), 802.16 standards, etc.

The technologies described herein have been described in relation to particular aspects, which are intended in all respects to be illustrative rather than restrictive. While the technologies described herein are susceptible to various modifications and alternative constructions, certain illustrated aspects thereof are shown in the drawings and have been described above in detail. It should be understood, however, that there is no intention to limit the technologies described herein to the specific forms disclosed, but on the contrary, the intention is to cover all modifications, alternative constructions, and equivalents falling within the spirit and scope of the technologies described herein.

What is claimed is:

1. A computer-implemented method, comprising:
generating two GAN-induced transformations by adding a perturbation code to two latent codes in a latent space of a generative adversarial network (GAN);
determining, at an auxiliary network (AN) coupled to the GAN, a difference between respective feature representations of the two GAN-induced transformations; and
training the GAN based on the difference between the respective feature representations of the two GAN-induced transformations, wherein the training comprises disentangling the latent space of the GAN based on a prediction of the two GAN-induced transformations being caused by the perturbation code.

2. The method of claim 1, wherein the training comprises training the GAN to generate a same type of image transformation on a plurality of training images when the perturbation code is added to different latent codes in the latent space of the GAN.

3. The method of claim 1, wherein the training comprises training the AN and the GAN together with a self-supervised task, wherein the self-supervised task comprises adding different latent space perturbations to induce different GAN-induced latent transformations.

4. The method of claim 1, wherein the training comprises training the AN and the GAN together with an adversarial loss and an auxiliary loss, wherein the auxiliary loss is configured to cause a disentanglement of semantics encoded in the latent space of the GAN.

5. The method of claim 4, wherein the auxiliary loss is determined based on a prediction of whether a pair of GAN-induced latent transformations are caused by a same perturbation in the latent space.

6. The method of claim 1, further comprising:
sampling a distribution to obtain a plurality of latent codes and a plurality of perturbation codes;
generating a pair of baseline images from the GAN based on a pair of latent codes of the plurality of latent codes; and
generating a pair of transformed images from the GAN based on additions of respective perturbation codes to the pair of latent codes.

7. The method of claim 6, further comprising:
computing an auxiliary loss of the AN based on respective differences between the pair of baseline images and the pair of transformed images.

8. The method of claim 7, further comprising:
updating first learnable parameters of the AN based on the auxiliary loss of the AN; and
updating second learnable parameters of the GAN based on the auxiliary loss of the AN and an adversarial loss of the GAN.

9. The method of claim 1, further comprising:
in response to a request for a semantic edit, generating an image transformation corresponding to the semantic edit.

10. A computing system, comprising:
a generative adversarial network (GAN) including one or more generators connected with one or more discriminators;
an auxiliary network (AN), connected to the one or more discriminators of the GAN; and
a processor, operationally connected to the GAN and the AN, being configured to execute instructions to train the AN to cause a disentanglement of a latent space of the one or more generators based on a prediction of whether two GAN-induced transformations are caused by a common perturbation in the latent space.

11. The computing system of claim 10, wherein the AN is further trained to promote the one or more generators to generate images such that the two GAN-induced transformations are distinguishable at a feature representation level.

12. The computing system of claim 10, wherein the AN is configured to determine a difference between respective feature representations of two GAN-induced transformations.

13. The computing system of claim 12, wherein the GAN and the AN are trained with an adversarial loss and an auxiliary loss, wherein the auxiliary loss is based on the difference between the respective feature representations of the two GAN-induced transformations.

14. The computing system of claim 10, wherein the common perturbation comprises a perturbation code being added to a latent code in the latent space.

15. The computing system of claim 14, wherein the GAN is trained to generate a same type of image transformation on a plurality of training images when the perturbation code is added to different latent codes in the latent space of the GAN.

16. The computing system of claim 10, wherein the one or more generators are trained to generate, via the processor, image variations based on a plurality of source images.

17. The computing system of claim 10, wherein the one or more generators are trained to generate, via the processor, an image transformation at a semantic direction in response to a semantic edit request.

18. The computing system of claim 17, wherein the semantic edit request comprises altering an image of a person in a semantic direction of age, expression, or pose.

19. A computer system, comprising:
   means for generating two image transformations;
   means for determining a difference between respective feature representations of the two image transformations; and
   means for training a generative adversarial network (GAN) and an auxiliary network (AN) together with an auxiliary loss computed based on the difference between the respective feature representations of the two image transformations, wherein the auxiliary loss is configured to cause a disentanglement of semantics encoded in a latent space of the GAN.

* * * * *